United States Patent
Wakeland et al.

(10) Patent No.: US 6,317,119 B1
(45) Date of Patent: Nov. 13, 2001

(54) SPEED-COMPENSATED JOYSTICK

(75) Inventors: Carl Wakeland; J. Scott Fuller, both of Scotts Valley, CA (US); Hoon Quat Gek, Singapore (SG)

(73) Assignee: Creative Technology Ltd, Singapore (SG)

( * ) Notice: Subject to any disclaimer, the term of this patent is extended or adjusted under 35 U.S.C. 154(b) by 0 days.

(21) Appl. No.: 09/191,243

(22) Filed: Nov. 13, 1998

(51) Int. Cl.$^7$ .................................................. G06F 3/033
(52) U.S. Cl. ..................... 345/161; 345/156; 345/162; 74/471 XY; 463/38; 710/46; 710/73
(58) Field of Search ..................... 345/156, 161, 345/162; 710/46, 73; 463/38; 74/471 XY

(56) References Cited

U.S. PATENT DOCUMENTS

| | | |
|---|---|---|
| 4,107,642 | 8/1978 | Crummett . |
| 5,076,617 * | 12/1991 | Bronnert ............................ 285/349 |
| 5,319,785 * | 6/1994 | Thaller .................................. 710/15 |
| 5,369,748 | 11/1994 | McFarland et al. . |
| 5,371,800 | 12/1994 | Bhattacharya . |
| 5,386,517 | 1/1995 | Sheth et al. . |
| 5,566,351 * | 10/1996 | Crittenden et al. ................. 710/46 |
| 5,630,170 * | 5/1997 | Koizumi et al. ..................... 710/12 |
| 5,673,400 * | 9/1997 | Kenny ................................. 710/129 |
| 5,734,373 * | 3/1998 | Rosenberg et al. ................ 345/161 |
| 5,742,249 | 4/1998 | Hicok et al. . |
| 5,751,235 | 5/1998 | Hicok et al. . |
| 5,786,808 * | 7/1998 | Khoury .............................. 345/161 |
| 5,793,356 * | 8/1998 | Svancarek et al. ................. 345/161 |
| 5,805,138 * | 9/1998 | Brawne et al. ..................... 345/156 |
| 5,805,140 * | 9/1998 | Rosenberg et al. ................ 345/161 |
| 5,819,096 * | 10/1998 | Nelson et al. ...................... 710/260 |
| 5,986,644 * | 11/1999 | Herder et al. ...................... 345/158 |
| 5,999,168 * | 12/1999 | Rosenberg et al. ................ 345/161 |

* cited by examiner

Primary Examiner—Bipin Shalwala
Assistant Examiner—Vincent E. Kovalick
(74) Attorney, Agent, or Firm—Townsend and Townsend and Crew LLP; F. D. Nwamu

(57) ABSTRACT

A method for determining a position of a joystick in data communication with a processor and having an initial state that includes steps of varying the initial state in response to a signal from the processor; returning the joystick to the initial state after a duration of time, with the duration of time being dependent upon the position amongst a plurality of positions. A plurality of poll operations of the joystick are executed to sense the returning step. Each of the polling operations results in a data signal being transferred from the joystick indicating the state of the same, with consecutive poll operations being separated by a predetermined segment of time, defining a first interval and consecutive data signals operations being separated by a time period, defining a second interval. The second interval is increased to be greater than the first interval, the duration of time is measured by determining a number of data signals received by the processor between the varying step and the returning step. Thereafter, the spatial position of the joystick is determined.

13 Claims, 4 Drawing Sheets

SPEED-COMPENSATED JOYSTICK

BACKGROUND OF THE INVENTION

The present invention relates to an apparatus and a method for synchronizing communication between computer components with differing access rates. More specifically, the present invention relates to computer systems operating on legacy software and communicating with peripheral devices having PCI access rates.

From its inception, the computer industry has consistently increased the speed at which computer systems, such as personal computer systems, operate. This has resulted in different bus architectures operating at differing speeds. For example, the Industry Standard Architecture (ISA) bus was once a dominant standard for interconnecting computer sub-assemblies for over ten years. The longevity of the ISA bus resulted in a great number of computer systems being introduced into the marketplace that employ the same. Further, many computer components, such as software applications and peripheral devices, were introduced into the marketplace designed to operate on computer systems having the ISA bus. The ISA bus, however, soon proved to have limited usefulness as the information requirements of the computer systems increased. The access rate of an ISA bus is approximately eight-megahertz with a maximum data transfer rate of two megabytes per second. As a result, higher performance bus architectures were developed.

One improved bus architecture is the PCI bus which operates at approximately thirty-three megahertz, providing a data transfer rate of sixty-six megabytes per second. The PCI bus has quickly become an industry standard overcoming the technological problems present by the ISA bus. There exists, however, a great number of computer systems and applications software that are designed to operate on an ISA bus. As a result, there has been many prior art attempts to make computer systems, components and applications software, designed to operate on a PCI bus, compatible with computer systems, components and applications systems designed to operate on an ISA bus, i.e., backwards compatibility.

U.S. Pat. No. 5,673,400 to Kenny discloses an apparatus and method for controlling devices in a multiple bus system such as a system having two or more ISA type buses. Separate ISA bus controllers may be provided for each ISA bus, linked on a common bus system such as a PCI bus. One ISA controller may be designated as a primary ISA controller whereas other ISA controllers in the system may be designated as secondary ISA controllers. Each ISA controller in the system in provided with IRQ (interrupt request) enable bits to enable different interrupts for the corresponding ISA bus. Each secondary ISA controller outputs a signal IRQSER as a PCI side-band signal to the primary ISA controller to indicate which IRQs have been asserted on the respective ISA buses. The primary controller receives the IRQSER signal as well as the IRQ signals asserted on its own bus and converts these interrupt requests to PCI bus cycles. The primary bus controller may further provide a bit indicating which of a number of direct memory access channels are enabled for the primary bus controller. The primary controller receives direct memory access requests from the second buy system and generates a read or write cycle on the first bus system corresponding to outputs requests enabled by the bit mask.

U.S. Pat. No. 5,819,096 to Nelson et al. discloses an interrupt handling mechanism for converting PCI agent interrupts into interrupts compliant with a secondary bus standard interrupt protocol. PCU agent interrupts are processed by programmable logic for converting PCI compliant interrupts into, for example, ISA bus standard compliant interrupts for processing by a computer system which implements both PCI and ISA buses. A programmable register provided for selecting which ISA interrupt will be generated by the programmable logic in response to a PCI agent interrupt. While the foregoing architectures are well suited for allowing communication between bus architectures having differing access rates, the systems are complicated leading to an increased cost of manufacture.

What is needed, therefore, is a simplified method and apparatus to allow compatibility between computer components designed to operate at differing access rates.

SUMMARY OF THE INVENTION

Provided are a method and an apparatus to allow compatibility of computer systems and peripheral devices, designed to operate at access rates compatible with a PCI bus architecture, with software designed to operate on a bus architecture having slower access rates, such as an ISA bus architecture. Such software is referred to herein as "legacy software". The present invention is directed to solving a problem of having peripheral computer devices, such as a joystick system, designed to operate with PCI bus architecture, communicate with legacy software. Specifically, it was found that joystick systems designed to operate at access rates compatible with PCI bus architecture causes legacy software applications to malfunction. It was determined that too much data was being delivered by the peripheral devices due to the high data transfer rate.

To avoid the aforementioned problem, a method has been developed for determining a position of a joystick in data communication with a processor and having an initial state that includes steps of varying the initial state in response to a signal from the processor; returning the joystick system to the initial state after a duration of time, with the duration of time being dependent upon the position of the joystick amongst a plurality of positions; executing a plurality of poll operations of the joystick system to sense the returning step, each of which results in a data signal being transferred to the processor indicating the state of the joystick system, with consecutive poll operations being separated by a predetermined segment of time, defining a first interval and consecutive data signals operations being separated by a time period, defining a second interval; increasing the second interval to be greater than the first interval; and measuring the duration of time by determining a number of data signals received by the processor between the varying step and the returning step. Typically, the second interval is in the range of $3.75 \times 10^{31\ 7}$ to $10.00 \times 10^{-7}$ seconds, inclusive, and the first interval is in the range of $1.50 \times 10^{-8}$ to $9.00 \times 10^{-8}$ seconds.

To practice this method, a computer system is provided which features a delay circuit, coupled between the joystick system, and a processor to increase the interval between consecutive data signals transmitted to the processor in response to a polling operation executed by the same. The interval is sufficient to ensure that consecutive polling operations reaching the joystick system are separated by a latency equivalent to the period of the ISA access rate.

DESCRIPTION OF THE SPECIFIC EMBODIMENTS

Figure 1:
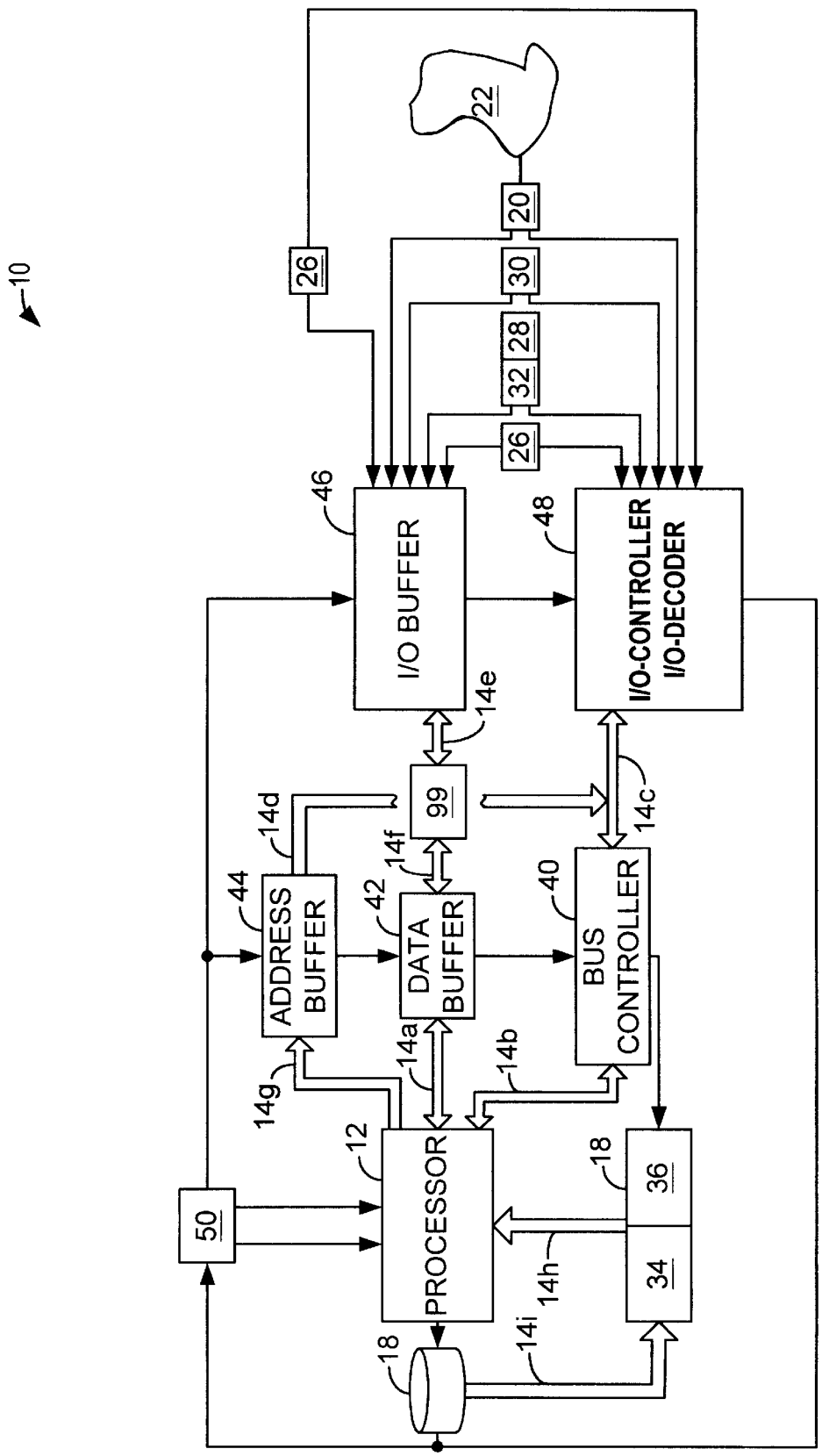
FIG. 1 is a simplified block diagram of a sub-assembly of a computer system showing data paths between a processor and a data port.

Referring to FIG. 1 the present invention is incorporated into a computer 10 of the type having one or more processors 12 in data communication with various devices via a bus subsystem 14. These devices typically include a memory subsystem 16, a persistent storage subsystem 18 for holding computer programs (e.g., code or instructions), as well. Also included may be a plurality of user interface input and output devices, discussed more fully below, and an interface to other equipment using networks with protocols such as Ethernet, Token Ring, ATM, IEEE 802.3, ITU X.25, Serial Link Internet Protocol (SLIP), a public switched telephone network and the like. This interface is shown schematically as a "Network Interface" block 20. It is coupled to corresponding interface devices in other computers via a network connection 22.

The user interface input devices typically include a keyboard 24 and a pointing device 26 connected to a serial port. Examples of pointing devices include a mouse, a trackball, a joystick system, a touch pad, a graphics tablet, or a touch screen incorporated into a display 28. Other types of user interface input devices, such as voice recognition systems and a scanner may also be included.

The user interface output devices typically include a printer 30 connected to the bus subsystem 14 and the display adapter 32. The display 28 may be a cathode ray tube (CRT), a flat-panel device such as a liquid crystal display (LCD), or a projection device. Display adapter 32 provides control signals to the display device and normally includes a display memory for storing the pixels that appear on the display device. The display subsystem may also provide non-visual display such as audio output.

The memory subsystem typically includes a number of memories including a main random access memory (RAM) 34 for storage of instructions and data during program execution and a read only memory (ROM) 36 in which fixed instructions are stored. In the case of Macintosh-compatible personal computers the ROM would include portions of the operating system; in the case of IBM-compatible personal computers, this would include the BIOS (basic input/output system).

The persistent storage subsystem 18 provides non-volatile storage for program and data files and typically includes at least one fixed disk drive and at least one floppy disk drive. There may also be other devices such as a CD-ROM drive and optical drives (all with their associate removable media). Additionally, the computer system may include drives of the type with removable media cartridges. The removable media cartridges may, for example be hard disk cartridges, such as those marketed by SYQUEST and others, and flexible disk cartridges, such as those marketed by IOMEGA. One or more of the drives may be located at a remote location, such as in a server on a local area network or at a site of the Internet's World Wide Web.

In this context, the term "bus subsystem" is used generically so as to include any mechanism for letting the various components and subsystems communicate with each other as intended. With the exception of the input devices and the display, the other components need not be at the same physical location. Thus, for example, portions of the file storage system could be connected via various local-area or wide-area network media, including telephone lines. Similarly, the input devices and display need not be at the same location as the processor, although it is anticipated that the present invention will most often be implemented in the context of personal computers and workstations.

Bus subsystem 14 is shown schematically as buses 14a–14i, but any number of buses may be included, as well as one or more expansion buses (e.g., ADB, SCSI, ISA, EISA, MCA, NuBus, or PCI), and/or serial and parallel ports. Network connections are usually established through a device such as network adapter on one of these expansion buses or a modem on a serial port. The client computer may be a desktop system or a portable system.

Communication between the input/output devices and the processor is facilitated by a bus controller 40, data buffer 42 and address buffer 44 connected to an input/output (I/O) buffer 46 and an I/O controller/decoder 48. The I/O buffer 46 is connected between the I/O devices and the bus controller 40, data buffer 42 and address buffer 44. The timing of data transfers between the various components and subsystems of the computer 10 is controlled by clock 50, which is connected in common to the same.

Many other devices or subsystems (not shown) may be connected in a similar manner. Also, it is not necessary for all of the devices shown in FIG. 1 to be present to practice the present invention, as discussed below. The devices and subsystems may be interconnected in different ways from that shown in FIG. 1. The operation of a computer system such as that shown in FIG. 1 is readily known in the art and is not discussed in detail in the present application. Source code to implement the present invention may be operably disposed in system memory 16 or stored on storage persistent subsystem 18. In a present embodiment, the method of interfacing applications with device drivers executes under the MICROSOFT WINDOWS95 and WINDOWS98 operating systems.

A problem solved by the present invention concerns data communication between computer systems and components having different access rates. Specifically, the present invention facilitates compatibility with software operating with computers systems and components having a substantially higher access rate than the software is designed to operate. Such software is referred to herein as "legacy software". A problem was encountered in that legacy software communicating with the pointing device 26, such as a joystick system, having access rates compatible with PCI bus architecture causes the software to malfunction. It is believed that too much data is delivered by the peripheral devices due to the high data transfer rate of the same.

Figure 2:
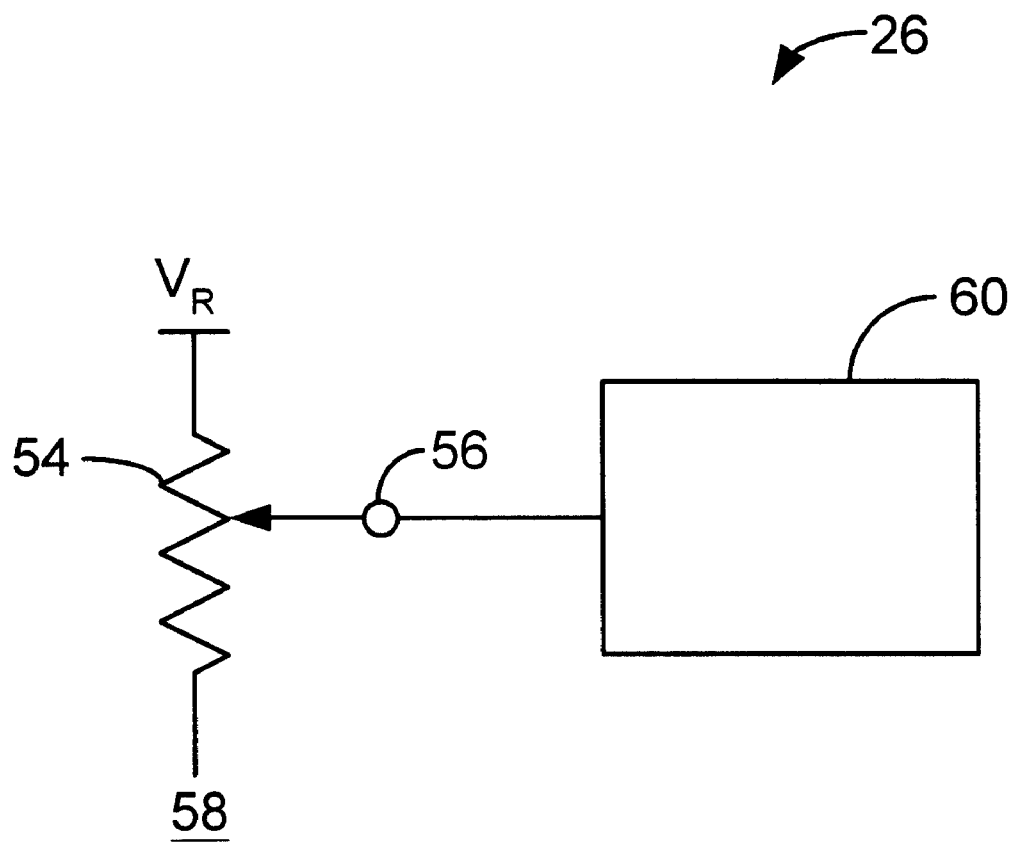
FIG. 2 is a simplified schematic showing a typical peripheral computer device, such as a joystick system.

Referring to FIG. 2, an essential element in the proper operation of a pointing device 26, such as a joystick system, is determining the position of the same. To that end, the joystick system 26 typically includes a three terminal variable resistor, i.e., potentiometer 54. One of the terminals of the potentiometer is connected to a reference voltage source $V_R$, one of the terminals is connected to a port 56 of the joystick system 26, and the remaining terminal 58 is unconnected. The port is connected to a resistor-capacitor (RC) timer circuit 60. In this example, the RC timer circuit is a one shot multi-vibrator. The position of the joystick system 26 is determined as a function of a resistance of the potentiometer 54. More particularly, the one shot multi-vibrator 60 includes a capacitor (not shown) which is discharged through both a fixed resistor (not shown) and the potentiometer 54. By varying the resistance of the potentiometer 54 the discharge time of the capacitor is varied, i.e., a delay is introduced. This delay corresponds to a spatial position of the joystick system 26.

Referring to both FIGS. 1 and 2, to determine the position of the joystick system 26, the processor 12 transmits an address to the address buffer 44 and write data to the data buffer 54. The bus controller 40 decodes the address signal from the address buffer 44 and accesses the joystick port 56. The data is then transmitted from data buffer 54 to the joystick system 26 as a write signal. The write signal varies an initial state of the joystick system 26 by charging the capacitor in the multi-state vibrator 60. Thereafter, the processor 12 periodically polls the I/O buffer 46 to determine whether the joystick system 26 has returned to the initial state, i.e., the processor 12 invokes a fetch operation to the I/O buffer 46, and a data signal is returned in response thereto, to determine whether the joystick system 26 has returned to the initial state, i.e., whether the state of the capacitor in the multi-state vibrator 60 is unchanged. Upon determining that the joystick system 26 has returned to the initial state, the processor determines the number of polling operations that occurred between the variation of the initial state and the return to the initial state. From the aforementioned number, the processor 12 calculates a delay from this number and determines the spatial position of the joystick system 26.

Figure 3:
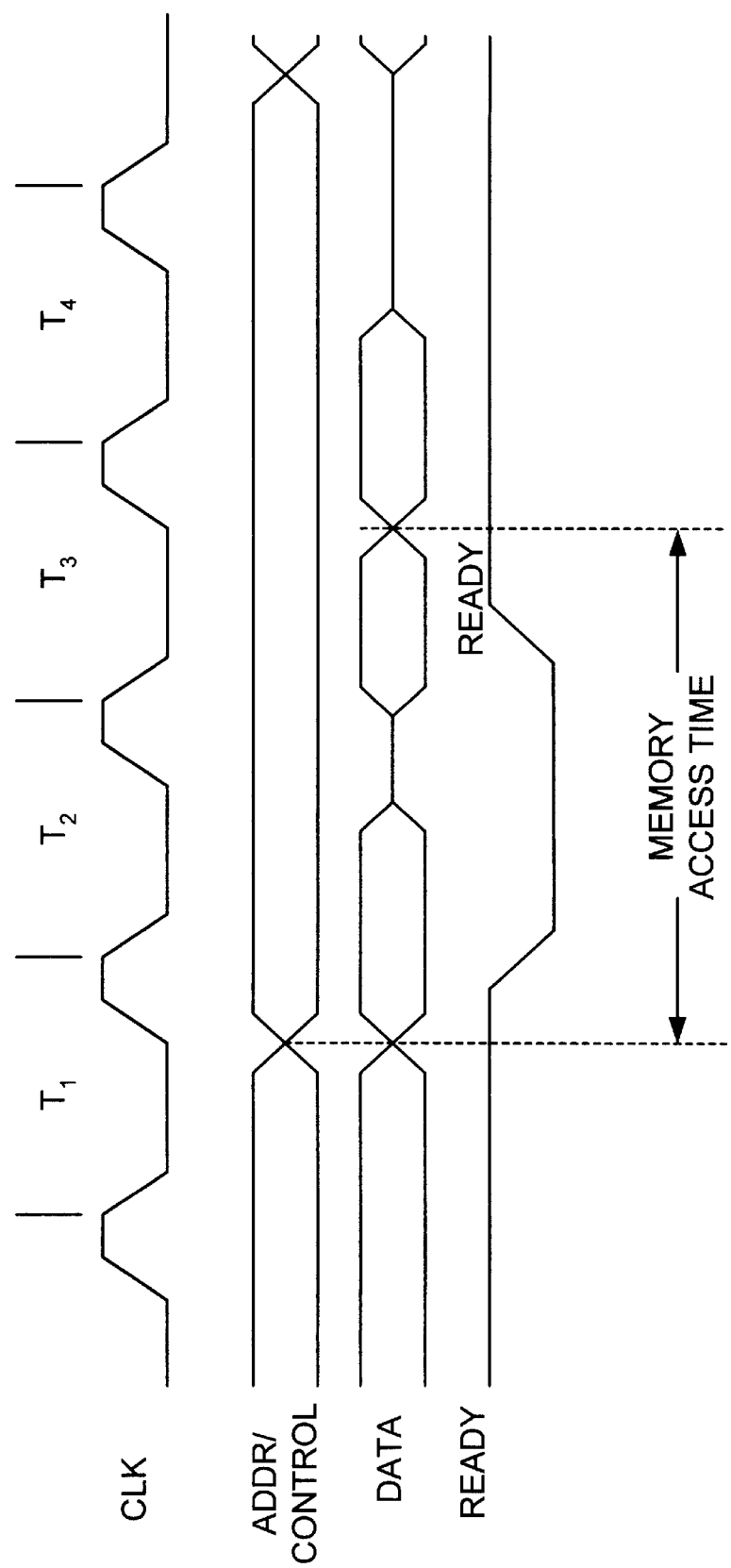
FIG. 3 is a diagram of signals on a ISA bus during a memory access cycle.

Referring to FIG. 3, a problem arose in that the legacy software operated at a substantially slower access speed than the joystick system 26. For example, legacy software, designed for the ISA access speeds of eight megahertz, was found to malfunction when communicating with a joystick system 26 designed to operate at access speeds compatible with a PCI bus, thirty-three megahertz. As a result, the number of polling operations that the legacy software would sense would be a far greater number than the program could handle effectively. This resulted in erroneous operation of the same. Specifically, for each read of the I/O buffer on an ISA bus, four cycles T1 to T4, are produced by a clock. During clock cycle T1, the processor 12 outputs control signals to the bus controller 40. This activates address and data buffers 44 and 42. The bus controller 40 then commences the read process of the joystick system 26. During the T2 cycle, the bus 14 is then switched from address bus mode to data bus mode. During the T3 cycle, the data transfer cycle begins. During this time the data is transferred from the joystick system 26 to the I/O buffer 46 and the processor 12 fetches the data therefrom. During the T4 cycle, the processor 12 completes the read process.

Figure 4:
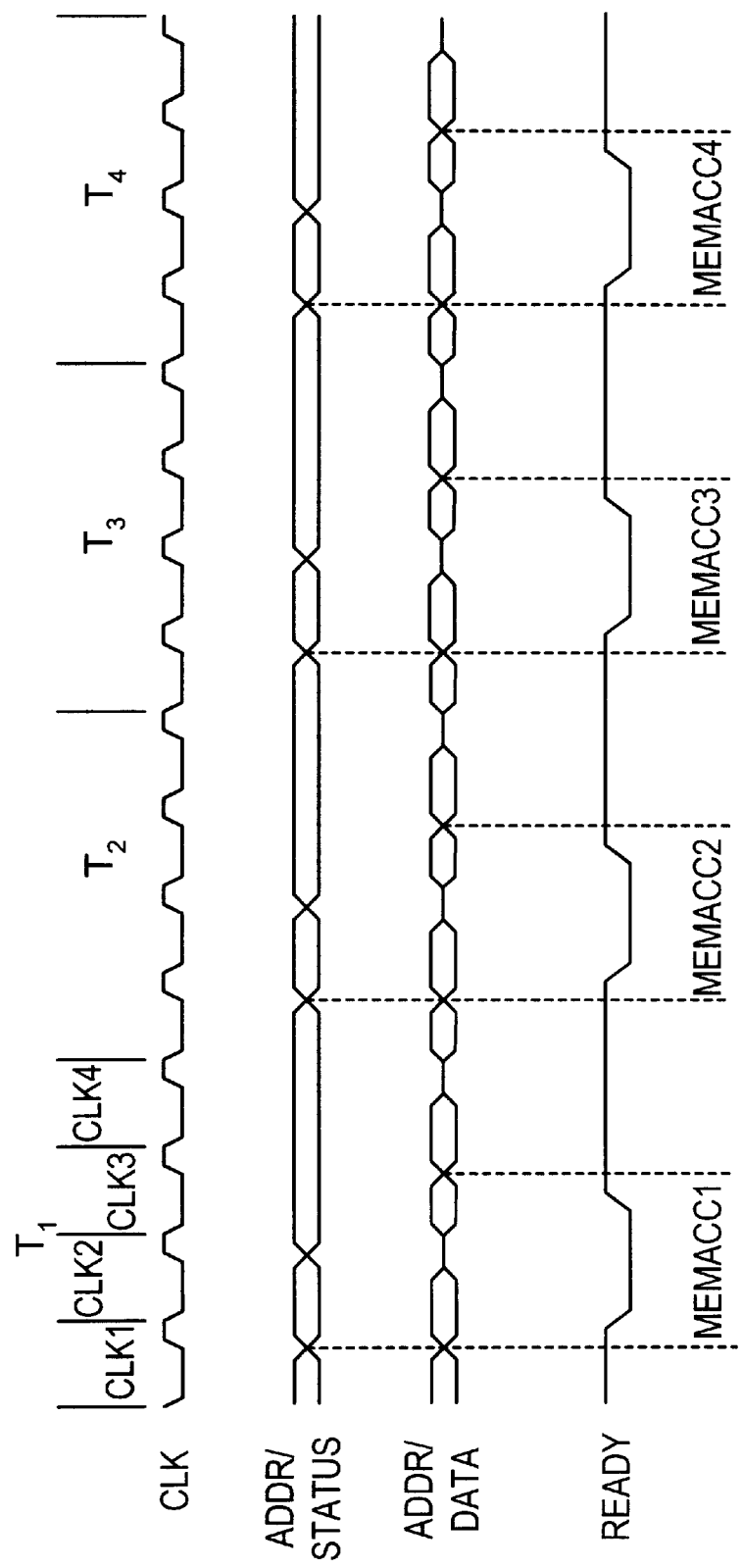
FIG. 4 is a diagram of signals on a PCI bus during a memory access cycle.

For a PCI data transfer, as shown in FIG. 4, the same operations occur at least four times faster, resulting in four times the data being fetched from the I/O buffer 46 by the processor 12. As seen in FIG. 4, the clock cycles T1–T4 correspond to clock cycles T1–T4 shown in FIG. 3. As seen in FIG. 4, during each of the four clock cycles, T1–T4, there are four PCI clock cycles, CLK1, CLK2, CLK3 and CLK4 shown with respect to clock cycle T1. As a result, between clock cycles T1–T4, the memory may be accessed at least four times on the PCI bus, shown as MEMACC1, MEMACC2, MEMACC3 and MEMACC4, compared to only one MEMORY ACCESS TIME for the ISA bus of FIG. 3. This results in at least four times more data being transferred to the processor 12, shown in FIG. 1 which causes legacy software to malfunction, as discussed above. To overcome the adverse effects of this increased data flow, delay circuit 99 is disposed between the processor 12 and the I/O buffer 46 which introduces a hiatus between the fetch operation and the data returned to the processor in response thereto. In the preferred embodiment, the delay circuit 99 is finite state machine that includes a time delay and selectively provides one of two output states: wait or go. The characteristics of the delay circuit 99 are such that data transmitted to the processor, in response to a fetch operation, is delayed so that consecutive data signals are spaced apart in the range of $3.75 \times 10^{-7}$ to $10.00 \times 10^{-7}$ seconds and preferably $7.60 \times 10^{-7}$ seconds. In this fashion, the data sent to the processor 12 arrives at an access rate equivalent to that of an ISA bus architecture. More particularly, consecutive fetch operations, reaching the delay circuit 99, are $1.50 \times 10^{-8}$ to $9.00 \times 10^{-8}$ seconds apart. Consecutive fetch operations exiting the delay circuit 99 and reaching the I/O buffer 46 are $3.75 \times 10^{-7}$ to $10.00 \times 10^{-7}$ seconds apart. To achieve this, it was found beneficial to commence the timer's operation in the delay circuit 99 after completion of a read cycle. The processor 12 is not provided with a mechanism to determine the start of a read cycle. After a read cycle is complete, the timer begins counting and the finite state machine is placed in a wait state, i.e., no fetch operations may be transmitted to the joystick system 26. After, the counter completes the counting operation, the finite state machine changes to a go state. The count operation terminates approximately $3.75 \times 10^{-7}$ to $10.00 \times 10^{-7}$ seconds after commencement. This allows a consecutive fetch operations to reach the I/O buffer 46 approximately $3.75 \times 10^{-7}$ to $10.00 \times 10^{-7}$ apart. In response to each fetch operation, the joystick system 26 returns a data signal. Thus, consecutive data signals transmitted to the processor 12 are separated by an interval of time equal to the interval of time which separates consecutive fetch operations exiting the delay circuit 99.

What is claimed is:

1. A method for determining a position of a joystick in data communication with a processor and having an initial state, said method comprising steps of:

varying said initial state in response to a signal from said processor;

returning said joystick to said initial state after a duration of time, with said duration of time being dependent upon said position amongst a plurality of positions;

executing a plurality of poll operations of said joystick to sense said returning step, each of which results in a data signal being transferred from said joystick indicating the state of said same, with consecutive poll operations being separated by a predetermined segment of time, defining a first interval;

transferring said data signals to said processor, with consecutive data signals operations being separated by a time period, defining a second interval;

increasing said second interval to be greater than said first interval; and measuring said duration of time by determining a number of data signals received by said processor between said varying step and said returning step wherein increasing step increases said second interval to be the range of 3.75×10-7 to 10.00×10-7 seconds, inclusive.

2. A method for determining a position of a joystick in data communication with a processor and having an initial state, said method comprising steps of:

varying said initial state in response to a signal from said processor;

returning said joystick to said initial state after a duration of time, with said duration of time being dependent upon said position amongst a plurality of positions;

executing a plurality of poll operations of said joystick to sense said returning step, each of which results in a data signal being transferred from said joystick indicating the state of said same, with consecutive poll operations being separated by a predetermined segment of time, defining a first interval;

transferring said data signals to said processor, with consecutive data signals operations being separated by a time period, defining a second interval;

increasing said second interval to be greater than said first interval; and measuring said duration of time by determining a number of data signals received by said processor between said varying step and said returning step wherein consecutive poll operations of said plurality of poll operations are separated by $1.50 \times 10^{-8}$ to $9.00 \times 10^{-8}$ seconds.

3. A method for determining a position of a joystick in data communication with a processor and having an initial state, said method comprising steps of:

varying said initial state in response to a signal from said processor;

returning said joystick to said initial state after a duration of time, with said duration of time being dependent upon said position amongst a plurality of positions;

executing a plurality of poll operations of said joystick to sense said returning step, each of which results in a data signal being transferred from said joystick indicating the state of said same, with consecutive poll operations being separated by a predetermined segment of time, defining a first interval;

transferring said data signals to said processor, with consecutive data signals operations being separated by a time period, defining a second interval;

increasing said second interval to be greater than said first interval; and measuring said duration of time by determining a number of data signals received by said processor between said varying step and said returning step wherein said increasing step increases said second interval to be approximately $7.60 \times 10^{-7}$ seconds.

4. A method for determining a position of a joystick in data communication with a processor and having an initial state, said method comprising steps of:

varying said initial state in response to a signal from said processor;

returning said joystick to said initial state after a duration of time, with said duration of time being dependent upon said position amongst a plurality of positions;

executing a plurality of poll operations of said joystick to each of which results in a data signal being transferred to said processor indicating the state of said joystick, with consecutive poll operations being separated by a predetermined segment of time, defining a first interval in the range of $1.50 \times 10^{-8}$ to $9.00 \times 10^{-8}$ seconds, inclusive;

transferring said data signals to said processor, with consecutive data signals operations being separated by a time period, defining a second interval;

increasing said second interval to be in the range of $3.75 \times 10^{-7}$ to $10.00 \times 10^{-7}$ seconds, inclusive;

measuring said duration of time by determining a number of data signals transmitted to said processor between said varying step and said returning step, defining a measurement; and determining from said measurement, a spatial position of said joystick.

5. The method as recited in claim 4 wherein said joystick includes a timer circuit having a capacitor wherein said initial state said capacitor has no charge and said varying step includes charging said capacitor and said returning step includes discharging said capacitor.

6. The method as recited in claim 5 wherein said joystick includes a potentiometer connected to a timer circuit having a capacitor wherein said duration of time is a function of a resistance of said potentiometer.

7. The method as recited in claim 6 wherein said increasing step increase said second interval to be approximately $7.60 \times 10^{-7}$ seconds.

8. A computer system, comprising:

a processor;

a memory;

a joystick having an initial state, with said processor, said memory and said joystick all being in data communication via a bus system having a first access rate associated therewith, and said memory retaining information corresponding to a computer program including a first subroutine to be operated on by said processor to vary said initial state, a second subroutine to be operated on by said processor to execute a plurality of poll operations, each of which results in a data signal being transferred to said processor indicating the state of the joystick, with consecutive poll operations being separated by a predetermined segment of time, defining a first interval, and consecutive data signals being separated by a time period, defining a second interval which is in the range of $3.75 \times 10^{-7}$ to $10.00 \times 10^{-7}$, inclusive, and a third subroutine to be operated on by said processor to measure a duration of time by counting a number of data signals transmitted to said processor between varying said initial state and said return to said initial state, with said third subroutine adapted to measure a predetermined number of data signals, defining a second access rate, with said first access rate being greater than said second access rate; and a delay buffer coupled between said joystick and said memory with said delay buffer adapted to ensure that said plurality of data signals are no greater than said predetermined number.

9. The system as recited in claim 8 wherein said joystick includes a multi-state vibrator having an output with said initial state including said output having a logical zero thereat.

10. The system as recited in claim 8 wherein said joystick includes a timer circuit having a capacitor wherein said initial state said capacitor has no charge and said varying step includes charging said capacitor and said returning step includes discharging said capacitor.

11. The system as recited in claim 10 wherein said joystick includes a potentiometer connected to a timer circuit having a capacitor wherein said duration of time is a function of a resistance of said potentiometer.

12. A computer system, comprising:

a processor;

a memory;

a joystick having an initial state, with said processor, said memory and said joystick all being in data communication via a bus system having a first access rate associated therewith, and said memory retaining information corresponding to a computer program including a first subroutine to be operated on by said processor to vary said initial state, a second subroutine to be operated on by said processor to execute a plurality of poll operations, each of which results in a data signal being transferred to said processor indicating the state of the joystick, with consecutive poll operations being separated by a predetermined segment of time, defining a first interval, and consecutive data signals being separated by a time period, defining a second interval, said second interval being approximately $7.60 \times 10^{-7}$ seconds and a third subroutine to be operated on by said processor to measure a duration of time by counting a number of data signals transmitted to said processor between varying said initial state and said return to said initial state, with said third subroutine adapted to measure a predetermined number of data signals, defining a second access rate, with said first access rate being greater than said second access rate; and a delay buffer coupled between said joystick and said memory with said delay buffer adapted to ensure that said plurality of data signals are no greater than said predetermined number.

13. A computer system, comprising:

a processor;

a memory;

a joystick having an initial state, with said processor, said memory and said joystick all being in data communication via a bus system having a first access rate associated therewith, and said memory retaining information corresponding to a computer program including a first subroutine to be operated on by said processor to vary said initial state, a second subroutine to be operated on by said processor to execute a plurality of poll operations, each of which results in a data signal being transferred to said processor indicating the state of the joystick, with consecutive poll operations being separated by a predetermined segment of time, defining a first interval, said first interval being approximately $1.50 \times 10^{-8}$ to $9.00 \times 10^{-8}$ seconds and consecutive data signals being separated by a time period, defining a second interval, and a third subroutine to be operated on by said processor to measure a duration of time by counting a number of data signals transmitted to said processor between varying said initial state and said return to said initial state, with said third subroutine adapted to measure a predetermined number of data signals, defining a second access rate, with said first access rate being greater than said second access rate; and a delay buffer coupled between said joystick and said memory with said delay buffer adapted to ensure that said plurality of data signals are no greater than said predetermined number.

* * * * *